United States Patent [19]

Matsubara et al.

[11] Patent Number: 4,777,586

[45] Date of Patent: Oct. 11, 1988

[54] SEMICONDUCTOR INTEGRATED CIRCUIT DEVICE WITH BUILT-IN ARRANGEMENT FOR MEMORY TESTING

[75] Inventors: Kiyoshi Matsubara, Kodaira; Tadashi Yamaura, Kokubunji, both of Japan

[73] Assignee: Hitachi, Ltd., Tokyo, Japan

[21] Appl. No.: 909,927

[22] Filed: Sep. 22, 1986

[30] Foreign Application Priority Data

Sep. 20, 1985 [JP] Japan .................................. 60-206419

[51] Int. Cl.⁴ ............................................. G06F 12/00
[52] U.S. Cl. ...................................................... 364/200
[58] Field of Search .................................. 364/200, 900

[56] References Cited

U.S. PATENT DOCUMENTS 4,414,665 11/1983 Kimura et al. .................. 364/900 X

OTHER PUBLICATIONS

Hitachi Microcomputer Data Book, 8-Bit Single Chip, Sep. 1983, pp. 146-148, and 166-168.

Primary Examiner—Raulfe B. Zache
Attorney, Agent, or Firm—Antonelli, Terry & Wands

[57] ABSTRACT

A semiconductor integrated circuit device which inhibits the output of programmed data of its built-in memory to external terminals but outputs the result of a comparison of the programmed data with an input signal supplied from a first external terminal to a second external terminal.

22 Claims, 2 Drawing Sheets

SEMICONDUCTOR INTEGRATED CIRCUIT DEVICE WITH BUILT-IN ARRANGEMENT FOR MEMORY TESTING

BACKGROUND OF THE INVENTION

This invention relates generally to a semiconductor integrated circuit device, and more particularly to a technique which is effective when applied to a semiconductor integrated circuit device having a microcomputer function, for example.

In a 1-chip microcomputer, for instance, predetermined data processing is performed in accordance with a program written into its built-in read-only memory (ROM). If the circuit arrangement is such as to output the programmed data of this built-in ROM to an external terminal, the possibility exists that the content of the program will be known to a third party. This is undesirable from the aspect of protection of software. However, the program content must be read out to the external terminal in order to test the memory.

As one prior art reference relating to the 1-chip microcomputer, mention can be made of the "Hitachi Microcomputer Data Book, 8-Bit Single Chip" published by Hitachi, Ltc., September, 1983, which is hereby incorporated by reference.

SUMMARY OF THE INVENTION

It is a primary object of the present invention to provide a semiconductor integrated circuit device which satisfies both the functions of the security of the programmed data of its built-in memory and testing of the memory.

The above and other objects and novel features of the present invention will become more apparent from the following description when taken in conjunction with the accompanying drawings.

Among the inventions disclosed herein, the following illustration is representative. Namely, the present invention inhibits the output of the programmed data of the built-in memory to the external terminal but outputs to the external terminal the result of comparison of the programmed data with an input signal supplied from another external terminal.

DESCRIPTION OF THE PREFERRED EMBODIMENTS

Figure 1:
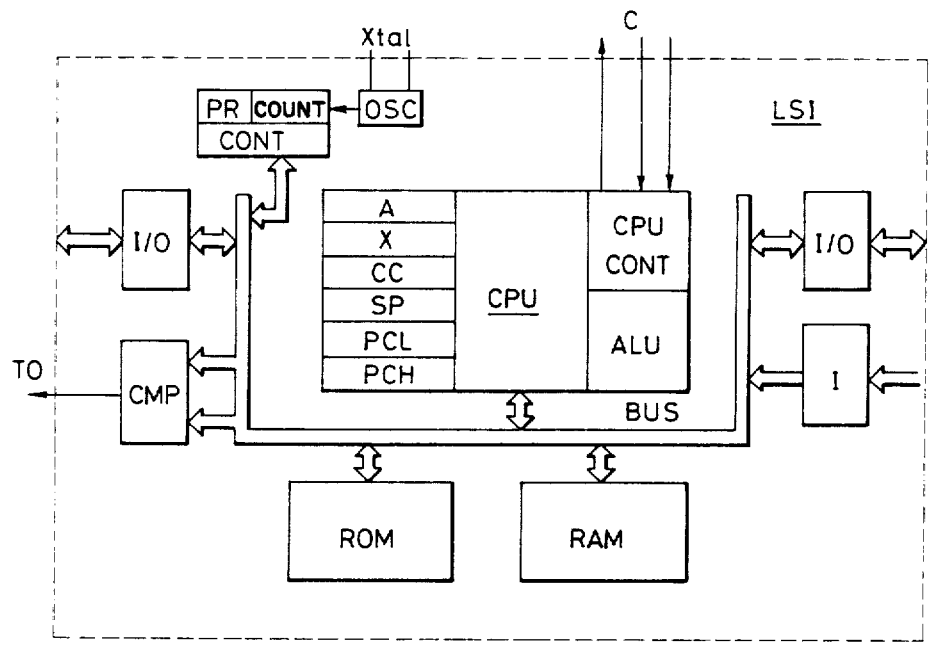
FIG. 1 is a block diagram of a 1-chip microcomputer to which the present invention is applied.

FIG. 1 is a block diagram of a 1-chip microcomputer in accordance with the present invention. In the drawing, the portion encompassed by dash lines is one LSI which constitutes as a whole a 1-chip microcomputer. It is formed on one semiconductor substrate such as a silicon substrate by known semiconductor integrated circuit production techniques.

Symbol CPU represents a microprocessor, and its principal constituent block is shown in the drawing as a representative example.

Symbol A represents an accumulator, X is an index register, CC is a condition code register, SP is a stack pointer, PCH and PCL are program counters, CPU-CONT is a CPU controller and ALU is an arithmetic logic unit.

The construction of the microprocessor CPU described above is well known in the art; hence, its detailed description will be omitted.

Symbol I/O represents an input/output port, which includes therein a data transfer bidirectional register. Symbol 1 represents an input-only port.

Symbol OSC represents an oscillator. Though not particularly limitative, the oscillator uses a quartz oscillator Xtal mounted on the LSI and generates a high precision reference frequency signal. A clock pulse necessary in the micro-processor CPU is prepared from this reference frequency signal. The reference frequency signal is used as a reference time pulse for a timer, too. This timer consists of a counter COUNT, a prescaler PR and a controller CONT. These circuits OSC, PR, COUNT and CONT consists of heretofore known circuits, respectively. This timer produces the clock pulses $\phi$ and $\bar{\phi}$ which will be used for controlling the comparison circuit CMP, as will be discussed later.

Symbol RAM represents a random access memory circuit or block which is used primarily as a memory circuit of temporary data. Though not particularly limitative, a known static random access memory is used as this random access memory.

Symbol ROM represents a read-only memory circuit or block, into which a program for various data processing operations is written. Though not particularly limitative, the read-only memory (ROM) of this embodiment consists of a mask ROM. This mask ROM comprises a plurality of word lines, a plurality of data lines crossing the word lines, respectively, and memory cells disposed at the points of intersection between the word lines and the data lines. The circuit block ROM further includes row and column address decoders for selecting the word lines and the data lines in accordance with row and column address signals supplied from the microprocessor CPU through the address bus, respectively. A precharge circuit and a sense amplifier circuit are connected to the data lines. Namely, the mask ROM of this embodiment comprises a known circuit. The output of the sense amplifier circuit is used as the output of the read-only memory ROM, which consists of an 8-bit unit and is outputted to the data bus through an output circuit (not shown in FIG. 1).

Each of the circuit blocks described above is connected to each other by the buses BUS with the microprocessor being the center. The buses BUS includes the data bus, the address bus and the control bus.

In the microcomputer of this embodiment, the output of the programmed data of the read-only memory ROM to the external terminal or to the outside of LSI is inhibited for security purposes. In other words, the microcomputer is not equipped with the operational function of delivering the content of the read-only memory ROM to the external terminal. The following comparison circuit CMP is disposed in order to easily test such a read-only memory ROM.

This comparison circuit CMP compares the content of the read-only memory ROM, which is read out onto the data bus, with an input signal supplied from an external terminal, judges coincidence and discordance between them and outputs the result of comparison to the external terminal TO. In this embodiment, the result of judgment to be delivered to the external terminal TO is produced once per a plurality of comparing operations in order to enhance the security. Incidentally, the comparison circuit CMP is operative in a test mode and judges the coincidence and discordance between the ROM content and the input signal (expected value) supplied from any of the input/output ports I/O or the input-only port I.

Figure 2:
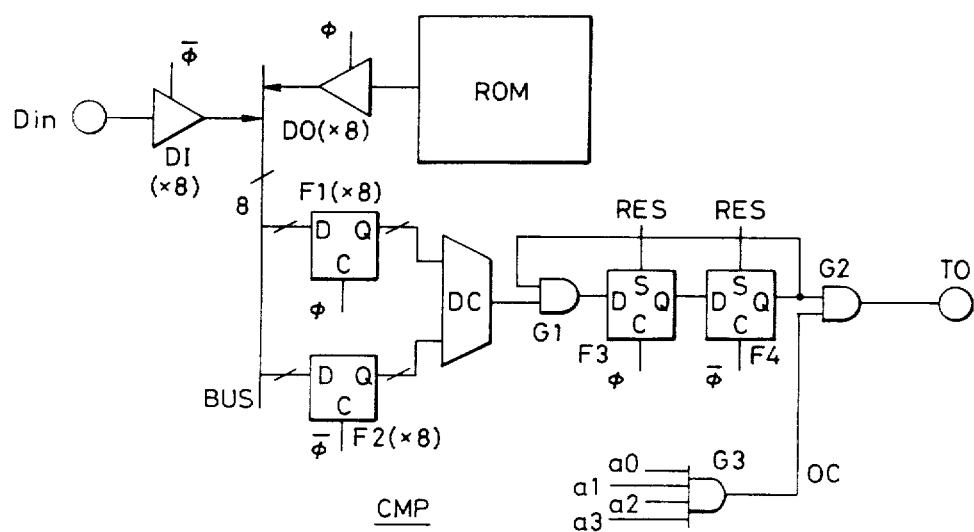
FIG. 2 is a circuit diagram of a comparison circuit of the microcomputer shown in FIG. 1.

FIG. 2 is a circuit diagram of one example of the comparison circuit CMP.

In the test mode, the input-only port I becomes operative automatically, though this circuit arrangement is not particularly limitative, so that the input circuit DI transfers the signal supplied from the external terminal Din to the data bus in the bus BUS in synchronism with an inverted clock signal $\phi$. FIG. 2 illustrates a typical example of one unit input circuit DI constituting the input-only port I. In the 8-bit signal chip microcomputer, eight unit input circuits DI are disposed and 8-bit input signals are supplied to eight data buses, though this circuit arrangement is not particularly limitative.

The 8-bit input signal supplied to each data bus is held by a D-type flip-flop circuit F2, which receives the input signal, simultaneously with the inverted clock signal $\phi$ (or in the low level period of the signal $\phi$). This flip-flop circuit F2 consists of eight flip-flop circuits to correspond to the 8-bit input signal.

The programmed data of the read-only memory ROM are read out in synchronism with the non-inverted clock signal $\phi$. In other words, the read signal of the read-only memory ROM is outputted to the data bus through the output circuit DO which is rendered operative by the clock signal $\phi$. The output circuit DO consists of eight output circuits, too, and delivers the 8-bit read signal read out from the read-only memory ROM to the data bus.

The 8-bit read signal supplied to the data bus is held by a D type flip-flop circuit F1, which receives the input signal, in synchronism with the clock signal $\phi$ (in the high level period of the signal $\phi$). This flip-flop circuit F1 consists of eight flip-flop circuits, too. Though not limitative in particular, the flip-flop circuits F1 and F2 may have a set terminal (or a reset terminal and a clear terminal). In such a case, a reset signal is supplied to the set terminal before the test mode, and the flip-flop circuits F1 and F2 can enter the set state, that is, the output can be set to the high level.

The signals received by the flip-flop circuits F1 and F2 are supplied to a digital comparator DC. The digital comparator DC consists of eight exclusive NOR circuits (coincidence/discordance circuits) and an eight input AND gate circuit that receives the outputs of the NOR circuits, respectively. The output of the flip-flop circuit F1 is supplied to one input terminal of each of the eight exclusive NOR circuits, and the output of the flip-flop circuit F2 is supplied to the other input terminal. The output of the AND gate circuit is used as the output of the digital comparator DC.

In order to further ensure security, the output signal of the digital comparator DC is not as such delivered to the external terminal TO but is outputted through the next output control circuit in this embodiment, through this circuit arrangement is not particularly limitative. In other words, the output signal of the digital comparator DC is supplied to the input terminal D of the D type flip-flop circuit F3 through the AND gate G1. The output signal Q of this flip-flop circuit F3 is supplied to the input terminal D of the D type flip-flop circuit F4. The flip-flop circuit F3 receives its input signal by means of the non-inverted clock signal $\phi$ (in the high level period of the signal $\phi$), while the flip-flop circuit F4 receives its input signal by means of the inverted clock signal $\phi$ (in the low level period of the signal $\phi$). These flip-flop circuits F3 and F4 are set by reset signals RES supplied to their set terminals S (or the reset terminal and the clear terminal) before the test mode. In other words, their outputs are at the high level.

The output signal of the flip-flop circuit F4 is supplied to the input terminal of the AND gate circuit G1 as its control signal on one hand, and is outputted to the external terminal TO as the result of comparison through the AND gate G2, on the other hand. The output signal OC of the AND gate circuit G3, that receives the 4-bit address signals a0–a3, is supplied to the other input of the AND gate circuit G2, though this is not particularly limitative. The lower 4 bits of the row or column address signal for the selection of the read-only memory ROM are used as the address signals a0–a3. The row or column address signals are sequentially incremented or decremented in order to test the read-only memory ROM. Therefore, the lower 4 bits of the address signal that are incremented or decremented in the test rise to the high level once per 16 incrementation or decrementation. Accordingly, the output signal OC rises to the high level once per 16 accesses to the read-only memory ROM, and the test result is outputted to the external terminal TO at a rate of 1 to 16 test cycles.

The test result may be outputted at a rate of once per 2, 4, 8, 32, 64, ... accesses. This can be set by changing the bit number of the input to the gate circuit G3. The test result can be outputted at a rate of 1 to 16 accesses by inputting the output of each stage of a 4-stage ripple counter to the gate circuit G3. The ripple counter is counted up in synchronism with the clock signal $\phi$ or $\phi$. Other counters can be likewise utilized. Thus, the test result can be output once per an arbitrary number of access times by changing the counter construction. In this case, random access can be made to the read-only memory in the test mode.

One example of the operation of the comparison circuit CMP will be described with reference to the timing chart shown in FIG. 3.

The flip-flop circuits F3 and F4 are set during the high level period of the reset signal RES before the test operation. In other words, their outputs are set to the high level. The AND gate circuit G1 is kept open.

Then, the test opration is started. Since the flip-flop circuit F3 operates in synchronism with the clock signal $\phi$, the test operation is started from th clock signal $\phi$ having the inverted phase.

The expected value EO corresponding to the programmed data of the read-only memory ROM to be read out is supplied to the data bus through the input-only port I in synchronism with the low level of the clock signal $\phi$ (the high level of the clock signal $\phi$). This signal EO is held by the flip-flop circuit F2. Since the flip-flop circuit F3 is inoperative when the signal $\phi$ is at the low level, the output of the comparator DC is not taken thereinto. Therefore, the output of the flip-flop circuit F4 is kept at the high level.

Though not particularly limitative, the row and column address signals are supplied to the read-only memory ROM during the low level period of the clock signal $\phi$, and the 8-bit output signal of the read-only memory ROM is taken into by the output circuit DO.

Next, the programmed data RO of the read-only memory ROM are outputted from the output circuit DO to the data bus in synchronism with the high level of the clock signal φ. This read signal RO is received by the flip-flop circuit F1 in synchronism with the clock signal φ. The signal RO of the flip-flop circuit F1 and the expected value EO are compared with each other by the digital comparator DC. The output of this comparator DC is transmitted to the input terminal of the flip-flop circuit F3 through the AND gate circuit G1 and is received in synchronism with the high level of the clock signal φ.

Figure 3:
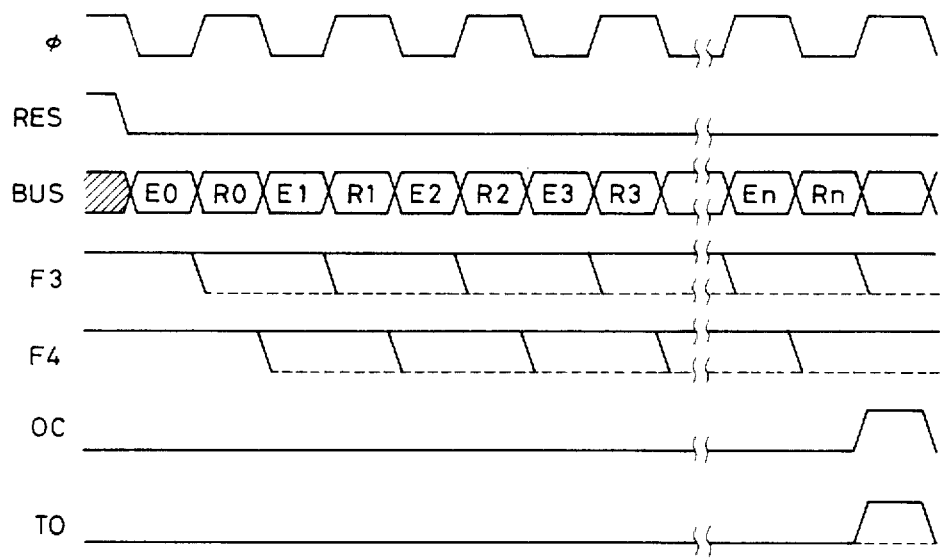
FIG. 3 is a timing chart useful for explaining the test operation of the microcomputer shown in FIG. 1.

If all the bits (8 bits) of the signal EO coincide with those of the signal RO, the output of the comparator DC is at the high level, so that the output signal of the flip-flop circuit F3 are kept at the high level as represented by solid line in FIG. 3. If any one of the bits of the signal EO is not in agreement with that of the signal RO, the comparator outputs the low level signal, so that the output signal of the flip-flop circuit F3 is inverted to the low level (logic "0") as represented by dotted line in the chart.

The output signal of the flip-flop circuit F3 is transmitted to the flip-flop circuit F4 in synchronism with the fall of the clock signal φ to the low level.

When the discordance signal (logic "0") is transmitted to the flip-flop circuit F4, the output of the flip-flop circuit F4 drops to the low level. As a result, the output of the AND gate circuit G1 is kept fixed at the low level. In other words, the AND gate circuit G1 is closed to inhibit the reception of the subsequent comparator outputs.

When the clock signal φ drops once again to the low level as described above, the input of the next expected value E1 is effected. Thereafter, the same operation is repeated, and the indirect read operation read-only memory ROM, that is, comparison with the expected value and output of judgment, makes it possible to test the memory.

In this embodiment, since only the comparison judgment output signal is delivered, decoding of the ROM content by a third party who does not know the ROM program content cannot be made.

The present invention provides the following effects.

(1) The programmed data of the ROM can be read out indirectly by suppling the expected value from the external terminal and outputting only the result of its comparison judgment. Accordingly, only those who know the content of the ROM can test it.

(2) The expected value is supplied from an external terminal and is compared with the programmed content of the memory storing the security data, and only the result of comparison judgment is outputted. Therefore, the programmed content of the memory cannot be decoded substantially by those who do not know the content of the memory.

(3) Since the comparison judgment outputs of a plurality of times of comparison are outputted, it becomes unknown which expected value is wrong. Therefore, in order to decode the programmed content, the expected values consisting of an extremely large number of combinations must be generated, and decoding of the programmed content by the third party becomes substantially impossible. When one judgment result is outputted per 16 times of comparison operations for the 8-bit expected value as in the foregoing embodiment, the necessary number is as great as $2^{8 \times 16}$.

(4) In comparison with a circuit arrangement wherein the output function to the external terminal of the ROM or the like is completely inhibited by fuse means or the like, the present invention makes it possible to test the content of the memory as long as one knows the expected value. Therefore, this is extremely convenient for defect analysis and maintenance on the market.

Although the present invention has thus been described in its preferred form, the invention is not particularly limited to the embodiment but can of course be modified or changed in various manners without departing from the scope and spirit thereof.

For instance, the built-in ROM may be various known programmable ROMs such as EPROM (erasable-programmable ROM), EEPROM (electrically erasable-programmable PROM, etc.) to which data is written electrically.

It is also possible to employ the arrangement wherein the sequence for establishing the test mode is not laid open or a keyword is required for establishing the test mode. Such an arrangement can further enhance the security of the programmed content.

Various forms may be used for the system configuration of the 1-chip microcomputer. For example, a switch which is turned ON only in the test mode may be disposed between each data bus and each of the flip-flop circuits F1 and F2. Signals other than the signal φ may be supplied to the circuit DI and DO at times other than the test mode. Additional circuits such as A/D converters and the like may be further incorporated in order to expand the functions of the microcomputer. The built-in ROM may be of such a type into which data is written.

The present invention can be widely applied to semiconductor integrated circuits having the microcomputer function such as the 1-chip microcomputer or IC cards, or to semiconductor integrated circuit devices which are equipped with a built-in ROM and which process signals in accordance with the content of the ROM or a semiconductor memory device.

We claim:

1. A semiconductor integrated circuit device including a plurality of external terminals for receiving signals to be supplied to the device or outputting signals from the device, comprising:

a memory circuit, an output of predetermined programmed data of which is inhibited to said external terminals; and a comparing circuit including comparing means for comparing the programmed data read out from said memory circuit with an input signal supplied from a first one of said external terminals, and output means for outputting a resulting coincidence or discordance signal to a second one of said external terminals.

2. A semiconductor integrated circuit device according to claim 1, wherein said memory circuit comprises a read-only memory.

3. A semiconductor integrated circuit device according to claim 1, wherein said coincidence or discordance signal is output once after a plurality of said programmed data is compared with a plurality of input signals supplied from at least the first one of said external terminals corresponding to said programmed data.

4. A semiconductor integrated circuit device according to claim 3, wherein said programmed data is read out in a unit of a plurality of bits.

5. A semiconductor integrated circuit device according to claim 3, wherein the output means is coupled to receive address signals and further wherein said output means is controlled by said address signals.

6. A semiconductor integrated circuit device according to claim 3, wherein the output means is controlled by a counter circuit coupled to the comparing circuit in synchronism with an operation of the comparing means.

7. A semiconductor integrated circuit device according to claim 3, wherein said comparing circuit includes holding means for holding said coincidence or discordance signal and inhibiting means for inhibiting a reception of subsequent results of comparison after one discordance signal has been generated and is being held by the holding means.

8. A semiconductor integrated circuit device according to claim 1, which further comprises a processor coupled to the memory circuit via an internal bus and which executes calculation based on said programmed data of said memory circuit, and wherein said memory circuit is comprised of a read-only memory storing therein programs or data for said processor.

9. A semiconductor integrated circuit device including a plurality of external terminals for receiving signals to be supplied to the device or outputting signals from the device, comprising:
- a memory circuit, an output of predetermined programmed data of which is inhibited to said external terminals; and
- a comparing circuit including comparing means for comparing the programmed data read out from said memory circuit with an input signal supplied from a first one of said external terminals, and output means for outputting a resulting coincidence or discordance signal to a second one of said external terminals,
- wherein said memory circuit and said comparing circuit are both formed on a single chip to allow testing of said memory circuit by operation of said comparing circuit without delivering data from said memory circuit outside of said single chip.

10. A microcomputer comprising:
- a CPU including means for performing predetermined data processing in accordance with a program;
- a memory means for memorizing information constituting the program;
- external terminals provided on a semiconductor integrated circuit device in which the microcomputer is formed;
- a comparing means coupled to at least one of the external terminals and to said memory means for comparing an input signal supplied from said at least one of the external terminals with an output signal read out from the memory means and for forming an output comparing signal based on comparing of said input signal and said output signal;
- output means coupled to said comparing means for delivering an output signal based on the output comparing signal of the comparing means to at least one of the external terminals; and
- a bus for connecting at least one of the external terminals with the CPU, the memory means or the comparing means.

11. A microcomputer according to claim 10, wherein the comparing means includes a comparing circuit for comparing a plurality of signals.

12. A microcomputer according to claim 11, wherein the comparing circuit compares a plurality of output signals read out from the memory means with a plurality of input signals supplied from at least one of the external terminals.

13. A microcomputer according to claim 12, wherein the output means includes a memory circuit for memorizing the output comparing signal of the comparing means.

14. A microcomputer according to claim 13, wherein the output means includes means for performing a logic function for processing a first output comparing signal of the comparing means and a second output comparing signal of the comparing means.

15. A microcomputer according to claim 14, wherein the logic function is an AND function.

16. A microcomputer according to claim 13, wherein the memory circuit comprises a flip-flop circuit.

17. A microcomputer according to claim 13, the CPU includes means for inhibiting delivery of the output signal read out from the memory means to at least one of the external terminals.

18. A microcomputer according to claim 10, wherein the microcomputer is formed on a single chip so that operation of the memory means can be tested by operation of said comparing means without delivering information memorized by said memory means outside of said single chip.

19. An IC card having a semiconductor integrated circuit device including a plurality of external terminals for receiving signals to be supplied to the device or outputting signals from the device, comprising:
- a memory circuit, an output of predetermined programmed data of which is inhibited to said external terminals; and
- a comparing circuit including comparing means for comparing the programmed data read out from said memory circuit with an input signal supplied from a first one of said external terminals, and output means for outputting a resulting coincidence or discordance signal to a second one of said external terminals.

20. An IC card having a microcomputer comprising:
- a CPU including means for performing predetermined data processing in accordance with a program;
- a memory means for memorizing information constituting the program;
- external terminals provided on a semiconductor integrated circuit device in which the microcomputer is formed;
- a comparing means coupled to at least one of the external terminals and to said memory means for comparing an input signal supplied from said at least one of the external terminals with an output signal read out from the memory means and for forming an output comparing signal based on comparing of said input signal and said output signal;
- output means coupled to said comparing means for delivering an output signal based on the output comparing signal of the comparing means to at least one of the external terminals; and
- a bus for connecting at least one of the external terminals with the CPU, the memory means or the comparing means.

21. A semiconductor device according to claim 2, 3, 4, 5, 6, 7, 8 or 9, wherein said semiconductor integrated circuit device is on an IC card.

22. A microcomputer according to claim 11, 12, 13, 14, 15, 16, 17 or 18, wherein said microcomputer is on an IC card.

* * * * *